(12) United States Patent
Toyota et al.

(10) Patent No.: US 11,518,219 B2
(45) Date of Patent: Dec. 6, 2022

(54) VEHICLE

(71) Applicant: TOYOTA JIDOSHA KABUSHIKI KAISHA, Toyota (JP)

(72) Inventors: Masaru Toyota, Toyota (JP); Sho Tsumita, Seto (JP); Yoshiyuki Ryuno, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 72 days.

(21) Appl. No.: 17/325,277

(22) Filed: May 20, 2021

(65) Prior Publication Data

US 2022/0009320 A1    Jan. 13, 2022

(30) Foreign Application Priority Data

Jul. 13, 2020    (JP) .............................. JP2020-120159

(51) Int. Cl.
*B60J 1/00*   (2006.01)
*B60J 1/20*   (2006.01)
*B60J 1/17*   (2006.01)

(52) U.S. Cl.
CPC ................. *B60J 1/006* (2013.01); *B60J 1/17* (2013.01); *B60J 1/20* (2013.01)

(58) Field of Classification Search
CPC ................. B60J 1/006; B60J 1/17; B60J 1/20

USPC ....................................................... 296/146.2
See application file for complete search history.

(56) References Cited

U.S. PATENT DOCUMENTS

| | | | |
|---|---|---|---|
| 6,397,524 B1 * | 6/2002 | Sakaguchi | E05F 11/485 49/502 |
| 2011/0016993 A1 * | 1/2011 | Suzuki | G08B 13/04 73/865.8 |

FOREIGN PATENT DOCUMENTS

| | | | |
|---|---|---|---|
| JP | 2015-085908 A | | 5/2015 |
| JP | 2015085908 A | * | 5/2015 |

* cited by examiner

*Primary Examiner* — D Glenn Dayoan
*Assistant Examiner* — Dana D Ivey
(74) *Attorney, Agent, or Firm* — Finnegan, Henderson, Farabow, Garrett & Dunner, LLP

(57) ABSTRACT

A vehicle may include: a window frame; a window glass pane configured to be manually raised and lowered with respect to the window frame; a hook fixed to an inner surface of the window glass pane; a bracket fixed to the window frame and configured to engage with the hook in a state where the window glass pane is in a fully closed position; and a cover covering a lower end of the bracket. A surface of the bracket may include a portion exposed from the cover, the portion being configured to be in contact with the hook in a state where the bracket engages with the hook.

4 Claims, 7 Drawing Sheets

← Outside of Cabin    Inside of Cabin →

Outside of Cabin ← → Inside of Cabin

VEHICLE

CROSS-REFERENCE TO RELATED APPLICATION

This application claims priority to Japanese Patent Application No. 2020-120159 filed on Jul. 13, 2020, the contents of which are hereby incorporated by reference into the present application.

TECHNICAL FIELD

The technique disclosed herein relates to a vehicle.

BACKGROUND

Japanese Patent Application Publication No. 2015-085908 describes a window mounted on a vehicle and manually raised and lowered. A window glass pane is manually raised and lowered with respect to a window frame, by which the window is opened and closed.

SUMMARY

In a manually raised and lowered window, a hook may be disposed on a window glass pane and a bracket may be disposed on a window frame. By manually raising the window glass pane to a fully closed position, the hook engages with the bracket and the window glass pane is thereby fixed in the fully closed position. In addition, by releasing engagement between the hook and the bracket and manually lowering the window glass pane, the window can be opened. In this type of window, when a user manually raises the window glass pane to the fully-closed position, the window glass pane may be displaced in its thickness direction within a margin of the window glass pane, and the window glass pane may thereby hit a lower end of the bracket. When the window glass pane hits the bracket as such, the window glass pane could be scratched. The present disclosure provides a technique that prevents a scratch in a window glass pane caused by hitting a bracket in a manually raised and lowered window mounted on a vehicle.

A vehicle disclosed herein may comprise: a window frame; a window glass pane configured to be manually raised and lowered with respect to the window frame; a hook fixed to an inner surface of the window glass pane; a bracket fixed to the window frame and configured to engage with the hook in a state where the window glass pane is in a fully closed position; and a cover covering a lower end of the bracket. A surface of the bracket may comprise a portion exposed from the cover, the portion being configured to be in contact with the hook in a state where the bracket engages with the hook.

In this vehicle, the lower end of the bracket is covered by the cover. Accordingly, when the window glass pane is displaced toward the bracket while manually raised, the window glass pane comes into contact with the cover. In other words, the cover prevents the window glass pane from directly hitting the lower end of the bracket. Accordingly, a scratch in the window glass pane can be prevented. In addition, the surface of the bracket comprises the portion exposed from the cover, and the portion is configured to be in contact with the hook in the state where the bracket engages with the hook. Consequently, the bracket and the hook can be optimally engaged with each other, thereby the window can be firmly locked.

DETAILED DESCRIPTION

Some of the technical elements of the vehicle disclosed herein will be listed below. It should be noted that the respective technical elements are independent of one another, and are useful solely or in combinations.

In an aspect of the vehicle disclosed herein, the bracket may be constituted of metal, and the cover may be constituted of resin.

In an aspect of the vehicle disclosed herein, the cover may cover an area of the surface of the bracket extending from an outer surface of the bracket to the lower end. The outer surface of the bracket refers to a surface which faces the outside of the vehicle, and faces an inner surface of the window glass pane in the state where the window glass pane is in the fully closed position.

According to this configuration, a scratch created when the inner surface of the window glass pane and the outer surface of the bracket scratch each other can be prevented.

In an aspect of the vehicle disclosed herein, the bracket may comprise: a base portion fixed to the window frame; an extending portion extending slantingly downward from the base portion toward outside of the vehicle; and an engaging portion located at a lower end of the extending portion and configured to engage with the hook.

In an aspect of the vehicle disclosed herein, the vehicle may further comprise a mark on the cover. An upper end of the hook may be located at a same height as or higher than the mark in a state where the window glass pane is in the fully closed position.

According to this configuration, the user can check whether the hook is suitably engaged with the bracket by viewing whether the upper end of the hook is located at the same height as or higher than the mark.

Figure 1:
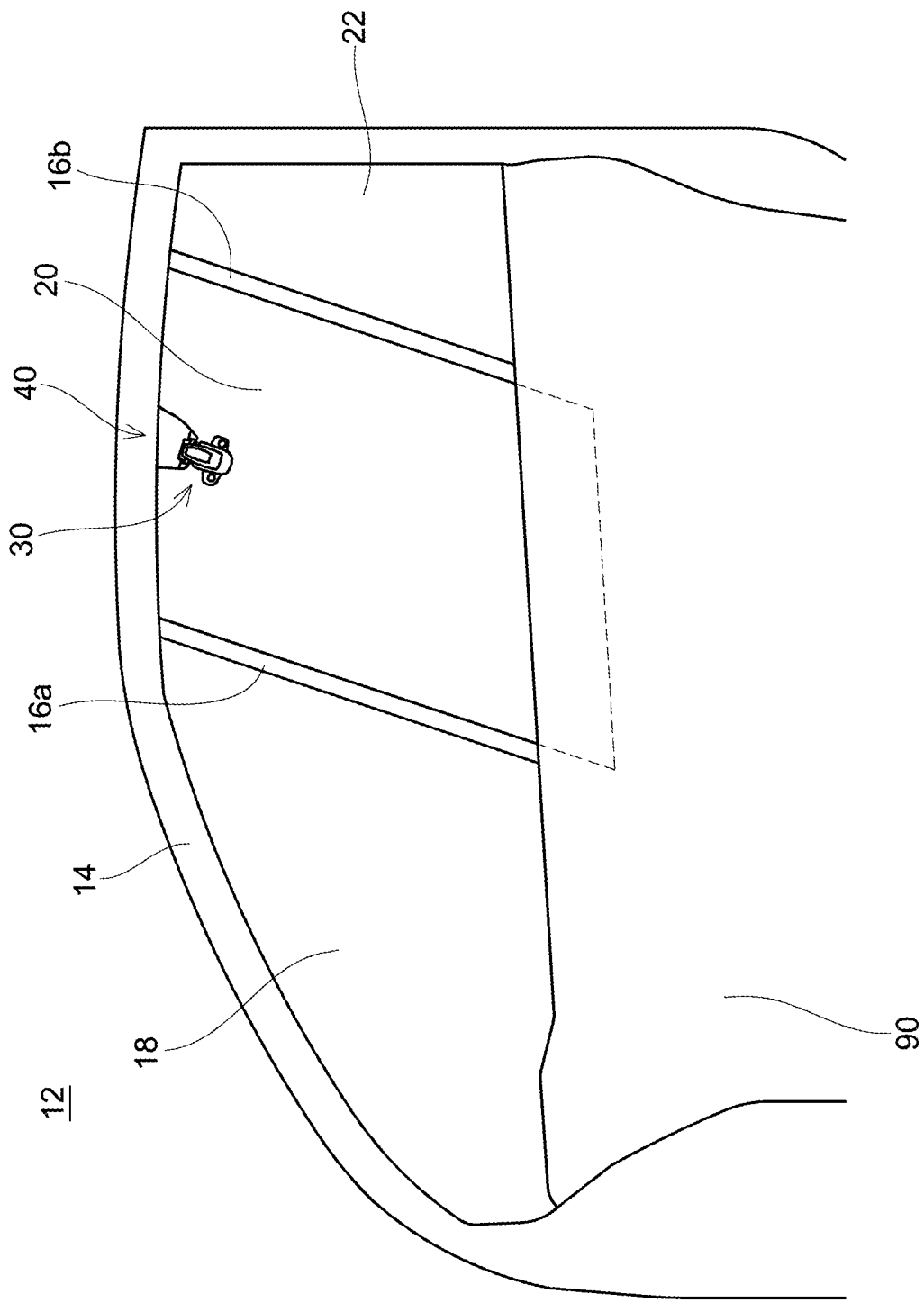
FIG. 1 illustrates a plan view of a door of a vehicle with a door glass pane closed, seen from inside a cabin.

FIG. 1 illustrates a view of a door 12 on the right side of a vehicle of a present embodiment seen from inside a cabin. The door 12 includes a window frame 14. Two frames 16a, 16b are disposed in the window frame 14. The frame 16a is disposed frontward of the frame 16b. The frames 16a, 16b extend straight in an up-down direction. The frames 16a, 16b extend in parallel. Three door glass panes 18, 20, 22 are disposed within the window frame 14. The door glass pane 20 is disposed at a position surrounded by the window frame 14 and the frames 16a. 16b. The door glass pane 18 is disposed frontward of the door glass 20. The door glass pane 18 is disposed at a position surrounded by the window frame 14 and the frame 16a. The door glass pane 22 is disposed rearward of the door glass pane 20. The door glass pane 22 is disposed at a position surrounded by the window frame 14 and the frame 16b.

Figure 2:
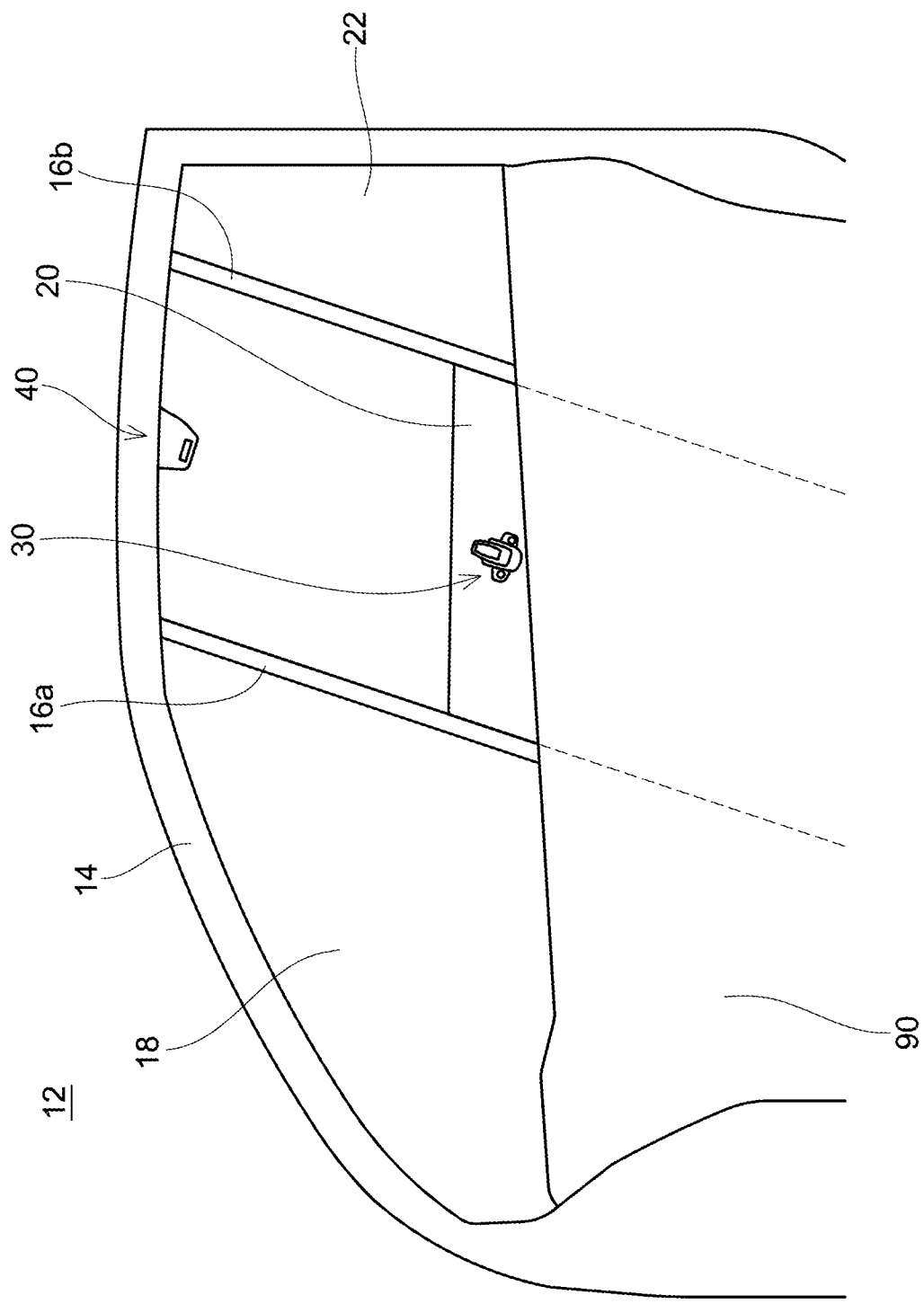
FIG. 2 illustrates a plan view of the door of the vehicle with the door glass pane opened, seen from inside the cabin.

A guiderail is disposed at each of the frames 16a, 16b. A front edge of the door glass pane 20 is supported by the guiderail of the frame 16a. A rear edge of the door glass 20 is supported by the guiderail of the frame 16b. The door glass pane 20 is configured to be raised and lowered along the frames 16a, 16b. The door glass pane 20 is configured to be manually raised and lowered. When the door glass pane 20 is lowered from a position of FIG. 1, a lower portion of the door glass pane 20 is stored in an interior panel 90 of the door 12 as illustrated in FIG. 2, and the window is thereby opened. When the door glass pane 20 is raised to the position of FIG. 1 from a position of FIG. 2, the window is closed. Hereinbelow, the position of the door glass pane 20 of FIG. 1 is referred to as a fully closed position. The door glass panes 18, 22 are fixed to the window frame 14 and corresponding one of the frames 16a, 16b. In other words, the door glass panes 18, 22 are not raised or lowered with respect to the window frame 14.

Figure 3:
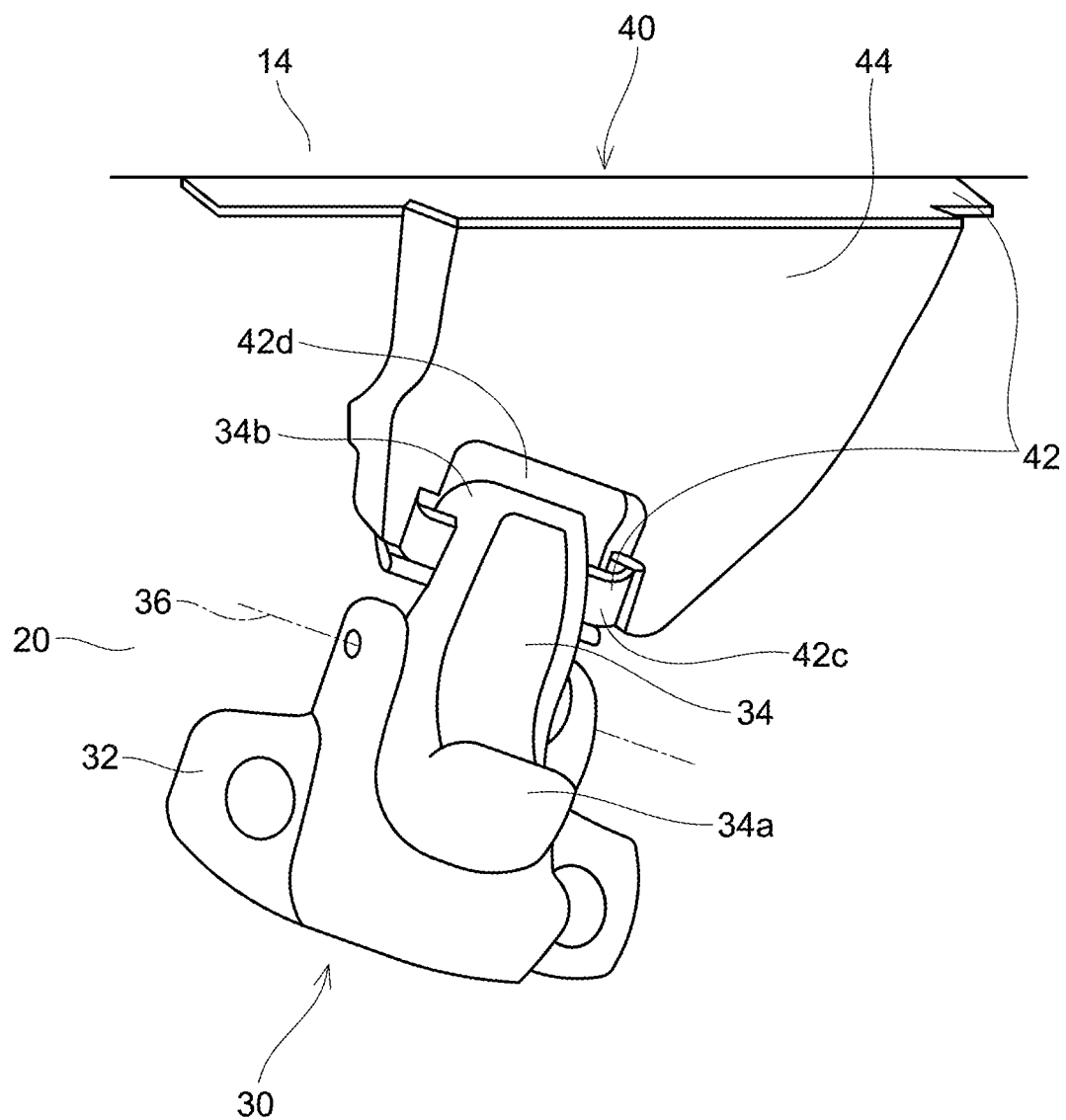
FIG. 3 is an oblique view of a first lock member and a second lock member.
Figure 4:
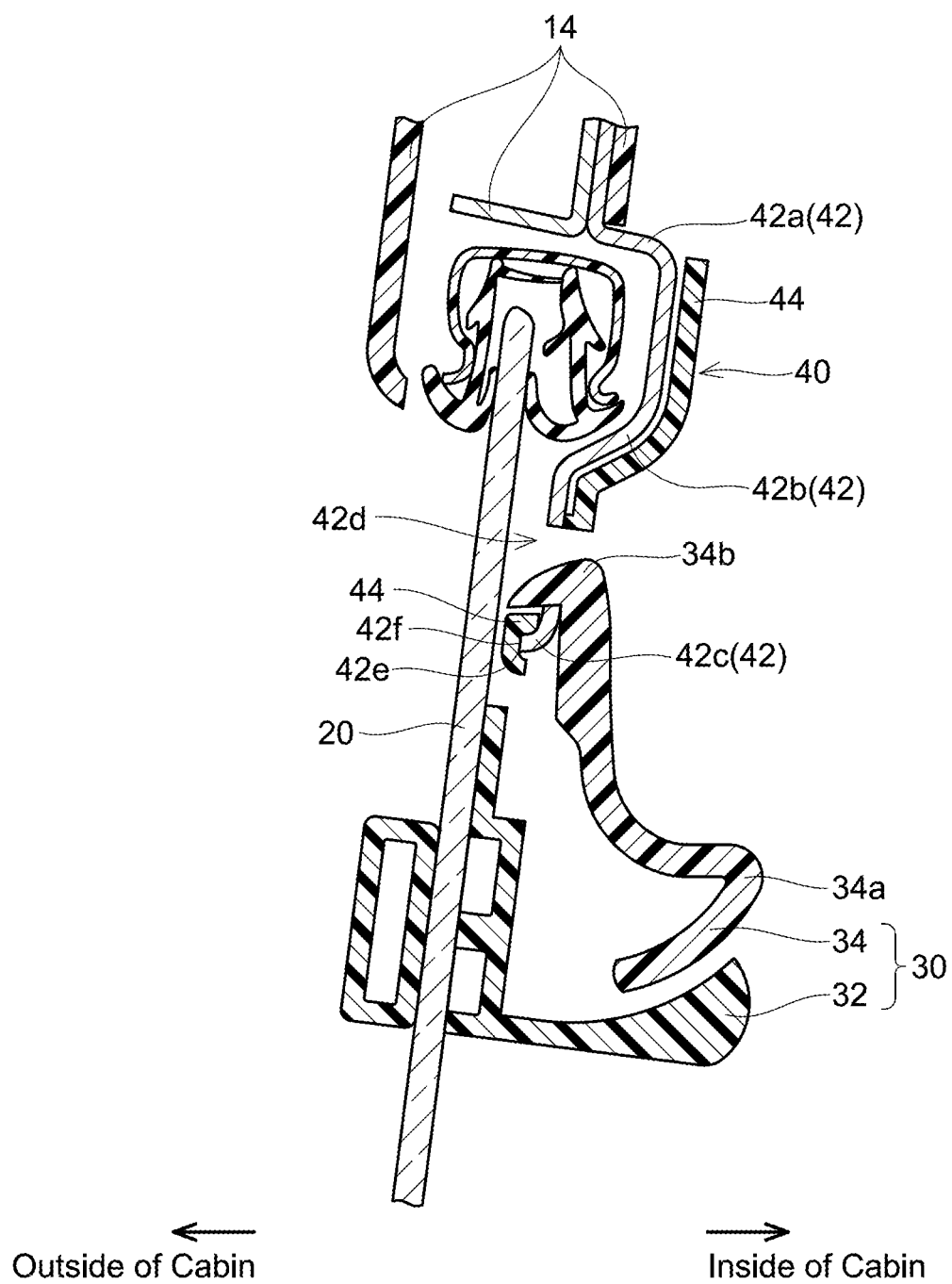
FIG. 4 illustrates a longitudinal, cross sectional view of the first lock member and the second lock member.

As illustrated in FIGS. 1 and 2, a first lock member 30 is disposed on an inner surface (a surface in the vehicle cabin) of the door glass pane 20. The first lock member 30 is disposed in a vicinity of a top edge of the door glass pane 20. As illustrated in FIGS. 3 and 4, the first lock member 30 includes a base 32 and a hook 34. The base 32 is fixed to the inner surface of the door glass pane 20. The hook 34 is attached to the base 32. The hook 34 is configured to be pivotable with respect to the base 32 about a shaft 36 (see FIG. 3) disposed in the base 32. The hook 34 includes a push portion 34a and a catch portion 34b. The shaft 36 is disposed between the push portion 34a and the catch portion 34b. Although not illustrated, the first lock member 30 includes a spring therein. The spring biases the catch portion 34b toward the door glass pane 20. Accordingly, when the user pushes the push portion 34a, the hook 34 pivots such that the catch portion 34b moves away from the door glass pane 20. When the user releases the push portion 34a, the hook 34 pivots such that the catch portion 34b approaches the door glass pane 20.

Figure 5:
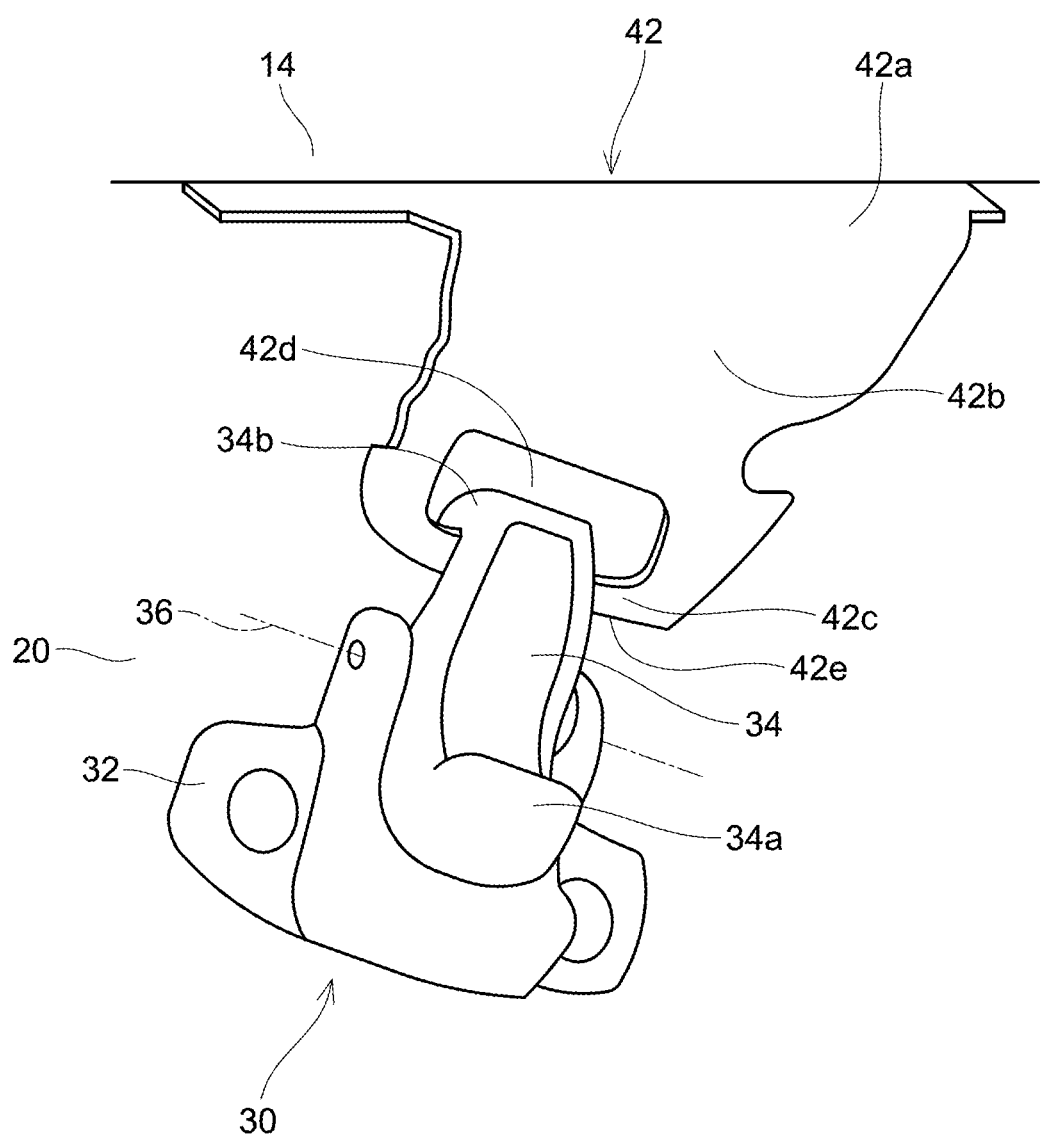
FIG. 5 illustrates an oblique view of the first lock member and the second lock member with a cover detached.

As illustrated in FIGS. 1 and 2, a second lock member 40 is disposed on the window frame 14 located at a top portion of the door glass pane 20. The second lock member 40 is disposed such that the second lock member 40 projects downward from the window frame 14 at the top portion of the door glass pane 20. The second lock member 40 is disposed at a position where it engages with the first lock member 30 in the state where the door glass pane 20 is in the fully closed position. As illustrated in FIGS. 3 to 5, the second lock member 40 includes a bracket 42 constituted of metal and a cover 44 constituted of resin.

As illustrated in FIGS. 4 and 5, the bracket 42 is a member produced by bending a metal plate. The bracket 42 includes a base portion 42a fixed to the window frame 14 and an extending portion 42b extending slantingly downward from the base portion 42a toward outside of the vehicle. The extending portion 42b defines a through hole 42d through the metal sheet. A portion of the bracket 42 located below the thorough hole 42d is an engaging portion 42c configured to engage with the hook 34. The engaging portion 42c is located at a lower end of the extending portion 42b. Consequently, the lower end of the engaging portion 42c corresponds to a lower end 42e of the bracket 42. The engaging portion 42c is disposed at a position most proximate to the inner surface of the door glass pane 20 (the door glass pane 20 in the fully closed position) than any other portion of the bracket 42.

In the state where the door glass pane 20 is in the fully closed position, the catch portion 34b of the hook 34 engages with the engaging portion 42c of the bracket 42. More specifically, a bottom surface of the catch portion 34b comes into contact with a top surface of the engaging portion 42c. By the hook 34 and the bracket 42 engaging with each other as such, the door glass pane 20 is fixed to the window frame 14 in the fully closed position. In other words, the door glass pane 20 is locked. When the user pushes the push portion 34a of the hook 34, the catch portion 34b is pulled out of the through hole 42d. As such, engagement between the hook 34 and the bracket 42 is released. When the user lowers the door glass pane 20 in the state where the engagement between the hook 34 and the bracket 42 is released, the door glass pane 20 moves downward as illustrated in FIG. 2. When the user raises the door glass pane 20 from the state illustrated in FIG. 2, the top surface of the catch portion 34b comes into contact with the engaging portion 42c, the catch portion 34b is pushed by the engaging portion 42c and thereby moves in a direction moving away from the door glass pane 20. When the user further raises the door glass pane 20, the catch portion 34b is inserted into the through hole 42d, thereby a bottom surface of the catch portion 34b comes into contact with the top surface of the engaging portion 42c. In other words, the hook 34 and the bracket 42 comes into engagement with each other. The door glass pane 20 is thereby locked in the fully-closed position. An enough engagement margin is provided between the catch portion 34b and the engaging portion 42c so that the lock is not released by an external force.

As illustrated in FIGS. 3 and 4, the cover 44 covers a surface of the bracket 42. Specifically, the cover 44 covers a surface of the extending portion 42b opposing the inside of the cabin, an outer surface 42f of the engaging portion 42c (that is, the surface opposing the inner surface of the door glass pane 20), and the lower end of the engaging portion 42c (that is, the lower end 42e of the bracket 42) among the surface of the bracket 42. At the engaging portion 42c, the cover 44 covers an area extending from the outer surface 42f to the lower end 42e of the engaging portion 42c.

Figure 6:
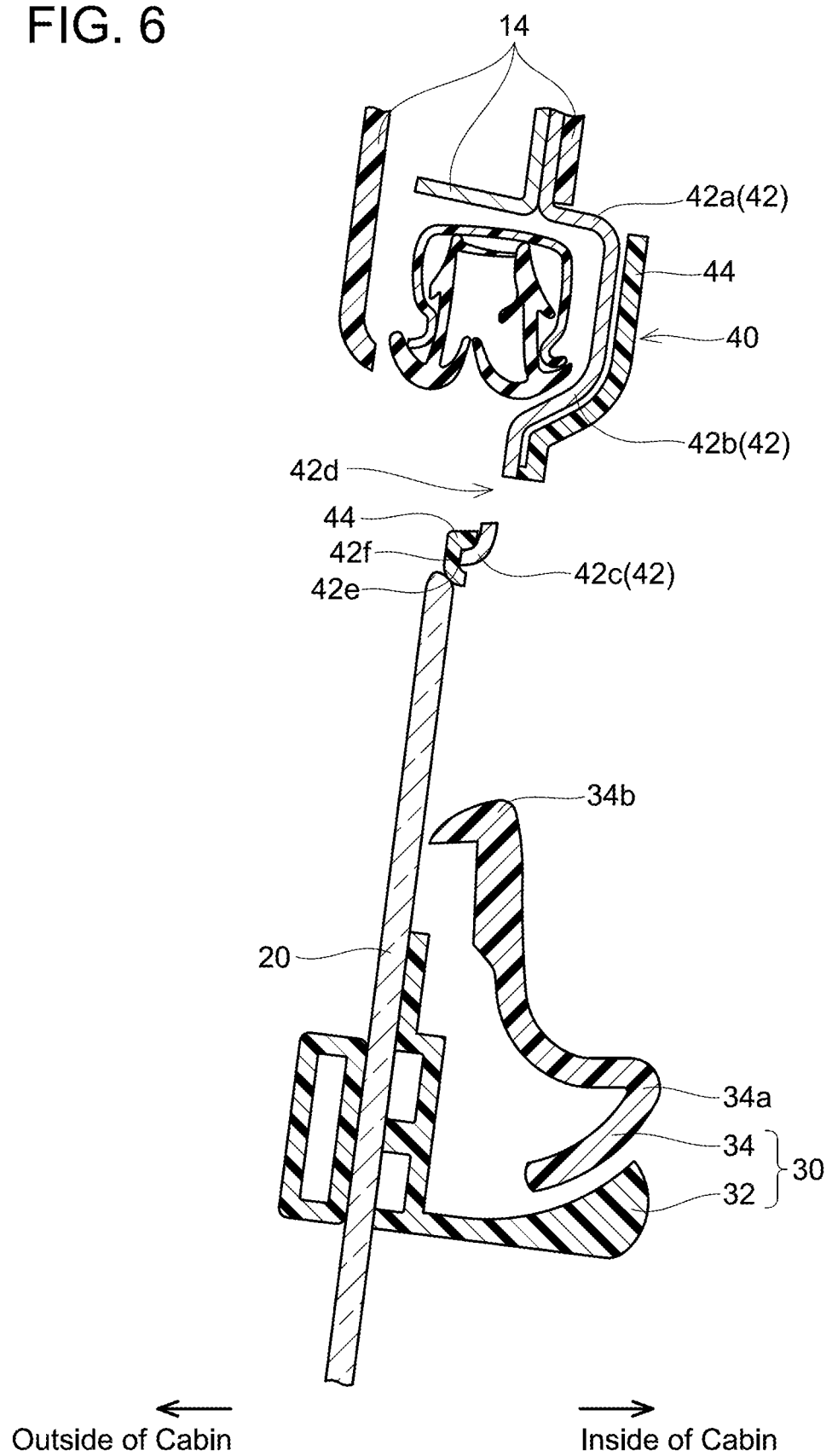
FIG. 6 illustrates a cross-sectional view illustrating a state in which the door glass pane hits the second lock member.

When the user raises and lowers the door glass pane 20, the door glass pane 20 may be displaced in a vehicle width direction within its margin. Consequently, when the user raises the door glass pane 20, the door glass pane 20 may be displaced toward the inside of the cabin, thereby the top edge of the door glass pane 20 may hit the second lock member 40 as illustrated in FIG. 6. As described above, since the extending portion 42b of the bracket 42 extends slantingly downward toward outside of the cabin and the engaging portion 42c is located at the lower end of the extending portion 42b, the top edge of the door glass pane 20 tends to hit the second lock member 40 in the vicinity of the lower end of the engaging portion 42c (that is, the lower end 42e of the bracket 42). In the present embodiment, since the lower end 42e of the bracket 42 is covered by the cover 44, the door glass pane 20 can be prevented from directly hitting the lower end 42e of the bracket 42. Since the cover 44 (resin) is softer than the bracket 42 (metal), the door glass pane 20 is not scratched even when the door glass pane 20 hits the cover 44. As such, since the lower end 42e of the bracket 42 is covered by the cover 44, the door glass pane 20 can be prevented from being scratched.

In addition, when the user raises the door glass pane 20, the inner surface of the door glass pane 20 and the second lock member 40 may scratch each other. In the present embodiment, the outer surface 42f of the engaging portion 42c of the bracket 42, which is disposed at the position most proximate to the door glass pane 20, is covered by the cover 44. Accordingly, when the inner surface of the door glass 20 and the second lock member 40 scratch each other, the inner surface of the door glass pane 20 scratches the cover 44. The cover 44 prevents the inner surface of the door glass pane 20 and the outer surface 42f of the engaging portion 42c from directly scratching each other. Consequently, a scratch in the door glass pane 20 can be prevented. As such, since the cover 44 covers an area of the bracket 42 extending from the outer surface 42f to the lower end 42e, the door glass 20 can be more suitably protected.

In addition, in the present embodiment, the top surface of the engaging portion 42c of the bracket 42 is exposed from the cover 44. In other words, the top surface of the engaging portion 42c is not covered by the cover 44. Consequently, when the bracket 42 and the hook 34 are engaged, the top surface of the engaging portion 42c directly comes into contact with the bottom surface of the catch portion 34b. The bottom surface of the catch portion 34b directly comes into contact with the top surface of the engaging portion 42c which is constituted of metal and thereby rigid, by which the window is firmly locked. In addition, since deformation caused by force or heat tends not to occur at the top surface of the engaging portion 42c, the engaging portion 42c and the catch portion 34b tend not to rattle at the engaging position.

Figure 7:
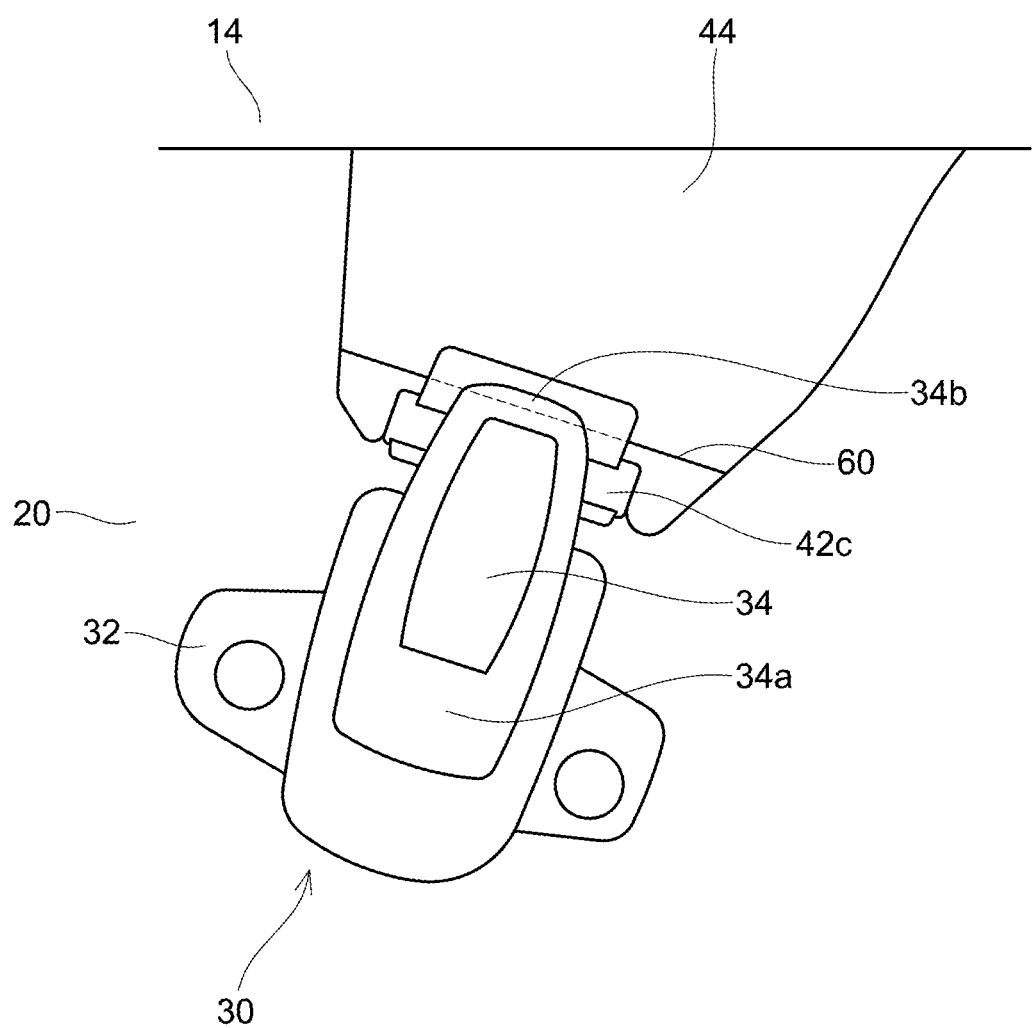
FIG. 7 is an explanatory view of a mark on the second lock member.

As illustrated in FIG. 7, the inner surface of the cover 44 may include a mark 60. A broken line in FIG. 7 is a line extending form the mark 60. In the configuration of FIG. 7, in the state where the door glass pane 20 is in the fully-closed position, the upper end of the hook 34 is located at the same height as or higher than the mark 60. Consequently, when the window is closed by raising the door glass pane 20, the user can check whether the hook 34 is suitably engaged with the bracket 42 by viewing whether the upper end of the hook 34 has reached the mark 60. Consequently, incomplete locking of the door glass pane 20 can be prevented.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A vehicle comprising:
   a window frame;
   a window glass pane configured to be manually raised and lowered with respect to the window frame;
   a hook fixed to an inner surface of the window glass pane;
   a bracket fixed to the window frame and configured to engage with the hook in a state where the window glass pane is in a fully closed position; and
   a cover covering a lower end of the bracket,
   wherein
   a surface of the bracket comprises a portion exposed from the cover, the portion being configured to be in contact with the hook in a state where the bracket engages with the hook, and
   the bracket comprises:
   a base portion fixed to the window frame;
   an extending portion extending slantingly downward from the base portion toward outside of the vehicle; and
   an engaging portion located at a lower end of the extending portion and configured to engage with the hook.

2. The vehicle of claim 1, wherein
   the bracket is constituted of metal, and
   the cover is constituted of resin.

3. The vehicle of claim 1, wherein the cover covers an area of the surface of the bracket extending from an outer surface of the bracket to the lower end.

4. The vehicle of claim 1, further comprising a mark on the cover,
   wherein an upper end of the hook is located at a same height as or higher than the mark in a state where the window glass pane is in the fully closed position.

* * * * *